Aug. 30, 1938.          C. G. OLSON          2,128,429
LOCKING DEVICE
Filed March 25, 1935
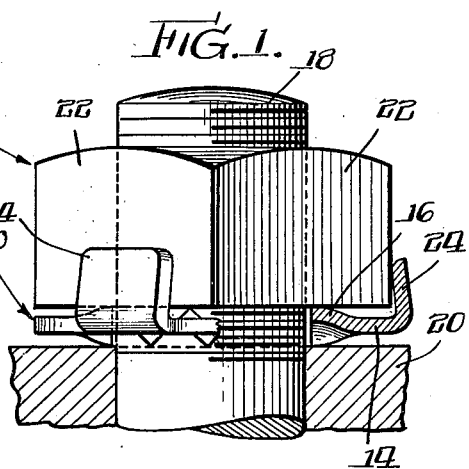
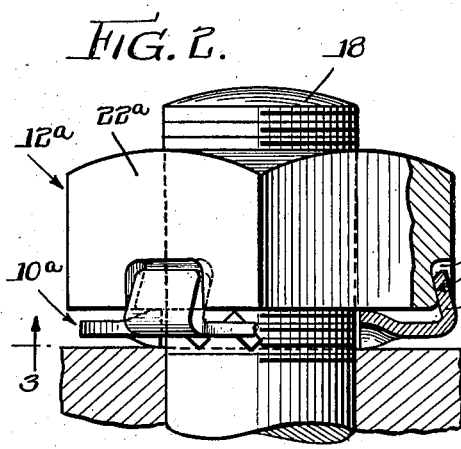
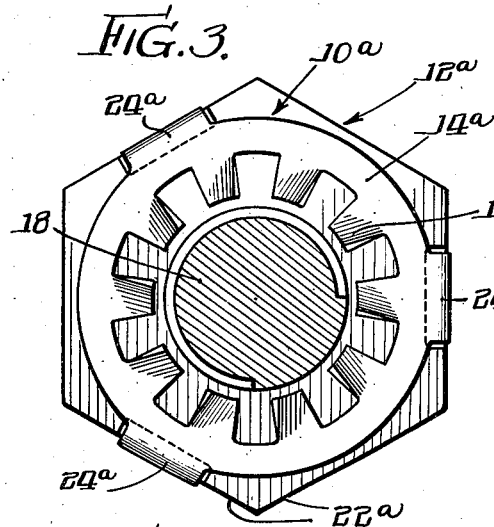
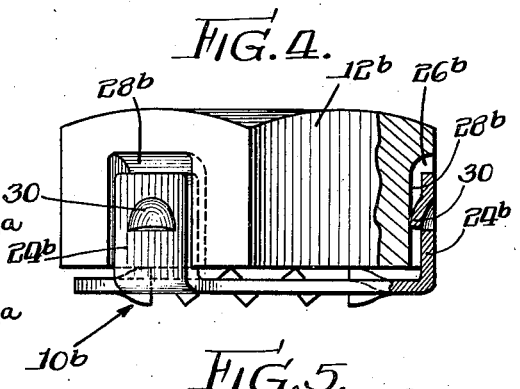
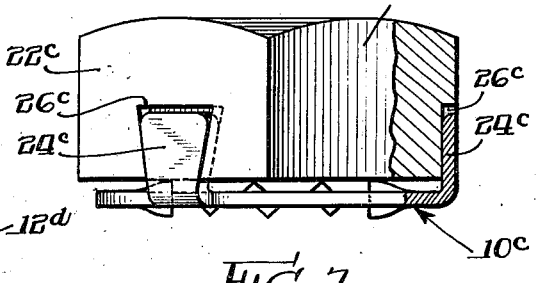
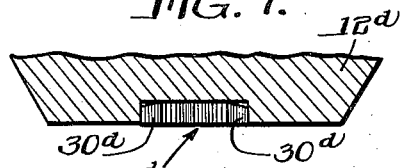
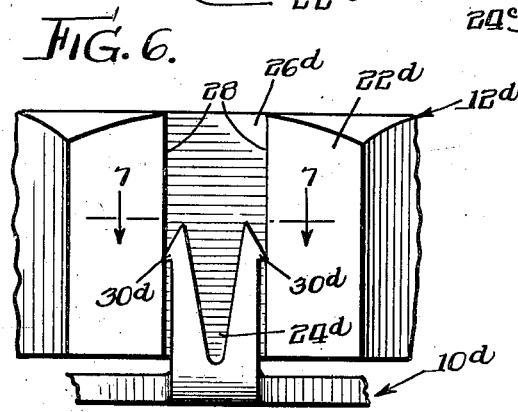
Inventor:
Carl G. Olson
By:— Cox & Moore attys

Patented Aug. 30, 1938

2,128,429

UNITED STATES PATENT OFFICE

2,128,429

LOCKING DEVICE

Carl G. Olson, Chicago, Ill., assignor to Illinois Tool Works, Chicago, Ill., a corporation of Illinois Application March 25, 1935, Serial No. 12,777

4 Claims. (Cl. 151—37)

My invention relates generally to lock washer assemblies, and particularly to the combination of a clamping head or nut with a lock washer.

My invention contemplates the provision of a very practical assembly of a lock washer with a clamping member, and to this end I propose to couple a lock washer and rotary clamping member by frictionally gripping the outer surface of the clamping member by members or prongs extending axially of the body of the washer.

More specifically, my invention contemplates an assembly, as set forth above, wherein the lock washer is of the type having a plurality of internal prongs or teeth warped to present work engaging edges or corners on opposite sides of the plane of the washer body. I propose to provide such a lock washer with resilient gripping elements or prongs extending axially from the outer periphery of the washer body, these gripping members being adapted, when the washer and clamping member are moved together, to resiliently bear against, and thus frictionally grip, the peripheral surface of the clamping member, and in this manner secure the washer and clamping member together as a unit in readiness for subsequent application to a work piece.

More specifically, my invention contemplates gripping exposed outer surfaces of the rotary clamping member, and to this end I propose to either grip the plain outer surfaces of the clamping member, such as the flat surfaces of a screw head or nut, or in the alternative, to provide recesses within the aforementioned surfaces for receiving the gripping elements of the washer.

The foregoing and numerous other objects and advantages will be more apparent from the following detailed description when considered in connection with the accompanying drawing, wherein—

Figure 1 discloses an assembly wherein the gripping elements of the washer frictionally bear against the conventional outer surfaces of a clamping member or nut;

Figure 2 is also a side elevational view of a modified washer assembly including a peripherally recessed nut and a lock washer having gripping elements extending within said peripheral recesses;

Figure 3 is a sectional view of the underside of the assembly of Figure 2 taken substantially along the line 3—3 of Figure 2;

Figure 4 is a modified arrangement disclosing a peripherally recessed clamping member and a lock washer provided with gripping elements adapted to resiliently embed themselves within the peripheral surface of the rotary clamping member;

Figure 5 discloses a further modification comprising a dovetailed arrangement of the gripping elements or tongues on the washer lodged within complementary dovetailed peripheral recesses in the clamping member;

Figure 6 is still a further modification of a peripherally recessed rotary clamping member coupled with resilient gripping elements or prongs of the lock washer; and Figure 7 is a fragmentary transverse sectional view of the assembly shown in Figure 6, said view being taken substantially along the line 7—7 of Figure 6.

Referring now to the drawing more in detail wherein like numerals have been employed to designate similar parts throughout the various figures, it will be noted that Figure 1 discloses an assembly contemplated by the present invention and includes a lock washer indicated generally by the numeral 10 coupled with a rotary clamping member or nut 12. The lock washer 10 is preferably formed from spring stock and includes an annular body portion 14 having a plurality of internal radial prongs 16. These prongs are annularly disposed about the central aperture of the washer to receive a screw member 18 extending upwardly from a work piece 20. The prongs 16 are so warped, bent or twisted as to present oppositely disposed corners or edges for lockingly engaging the underside of the clamping member 12 and the upper surface of the work piece 20. For purposes of illustration I have shown the clamping member 12 as a conventional hexagonal nut having six peripheral surfaces 22.

Extending axially of and formed integral with the washer body 14 is a plurality of spaced gripping elements or tongues 24. On the disclosed embodiment, the washer 10 is equipped with three equally spaced gripping elements, which elements are normally sprung slightly inwardly. Thus, when slipped over the companion side surfaces 22 of the nut 12, the gripping elements 24 are sprung outwardly and serve to yieldably bear against and frictionally secure the washer 10 to the under-surface of the nut 12. With this arrangement the nut need not be preformed or configurated in any way to receive the gripping elements. The frictional grip of the elements 24 against the side-surfaces 22 is sufficient to secure the washer and nut together as a unit. In other words, by this arrangement a workman need not first apply the washer to the screw or bolt and subsequently apply the nut to the washer. The gripping elements 24 obviously may be arranged to accommodate nuts or screw heads having side surfaces differing in number and shape. The fact that the nut or screw head need not be provided with recesses or in any way configurated to receive the gripping elements 24, reduces to a minimum the cost of production of the combined locking assembly or unit.

Referring now to Figures 2 and 3, it will be seen that my invention contemplates a modified assembly arrangement which includes a washer indicated generally by the numeral 10a combined with a nut indicated by the numeral 12a. Surfaces 22a of the nut are provided with side pockets or openings 26 to receive companion gripping elements 24a. The gripping elements 24a function similarly to the gripping elements 24 just described in that they are designed to yieldably and frictionally bear against the bottom surfaces 28 in the complementary openings 26. The gripping elements 24a, prior to the attachment of the washer 10a to the nut, are flexed or bent inwardly a distance which enables them to be flexed outwardly when they are applied to the nut. In other words, the gripping elements 24a, like the elements 24, yieldably and frictionally bear against the complementary surfaces 28 so as to impositively secure the nut and washer against axial separation. By providing the openings 26, the gripping elements 24a are more effectively concealed from view. The gripping elements 24 shown in Figure 1 extend sufficiently beyond the peripheral surfaces 22 of the nut to be clearly visible, whereas the gripping elements 24a are, to a considerable extent, shielded from view within the pockets 26. In Figure 3 I have shown a plan view of the underside of the combined washer and nut of Figure 2, and it will be noted that the washer includes an annular body 14a and a plurality of annularly arranged locking teeth or prongs 16a extending inwardly from the body.

In Figure 4 a further modification is disclosed which includes a washer 10b provided with a plurality of gripping elements 24b which are formed with struck out locking sections 30. These sections 30 are struck inwardly so as to present a work engaging edge which will have a tendency to embed itself within the surface 28b at the bottom of a recess 26b. These gripping elements 24b clampingly or yieldably bear inwardly when coupled with the nut 12b, thereby urging the locking edge of the struck out sections 30 into effective engagement with the stock of the nut. Any tendency to axially separate the washer 10b and the nut 12b is effectively counteracted by the digging in of the edge on the gripping element.

A still further modification is shown in Figure 5 wherein a washer 10c is provided with gripping elements 24c of dovetailed shape. The nut 12c is provided with complementary dovetailed openings or pockets 26c. When the washer 10 is initially applied to the nut, the gripping elements 24c are flexed outwardly to permit them to pass over the peripheral surfaces 22c of the nut. When the washer reaches its proper position with respect to the nut, the dovetailed gripping elements will register with and snap into the complementary dovetailed pockets 26c. The dovetailed arrangement positively secures the washer against axial displacement with respect to the nut.

In Figures 6 and 7 a still further modification is disclosed wherein a washer 10d is provided with a gripping element 24d, said gripping element being provided with a pair of gripping fingers or teeth 30d which correspond functionally with the struck-out locking sections 30 of Figure 4. These locking teeth 30d yieldably bearing against complementary oppositely disposed surfaces 28d within a recess 26d. The recess 26d preferably extends completely across the peripheral surface 22d. The upper extremities of the locking fingers 30d are chamfered so as to facilitate the initial association thereof with the nut. As the fingers are moved upwardly into the opening 26d, they are sprung toward each other, thereby causing the sharp points of the fingers to be resiliently urged into embedding relation with the surfaces 28d. Any tendency to axially separate the washer 10d and the nut 12d is effectively resisted by the digging action of the sharp corners of the fingers 30d into the surfaces 28d.

From the foregoing it will be apparent that my invention contemplates an assembly wherein a washer may be effectively combined with a nut with the least possible effort, and without changing to any marked degree the structure of the clamping member or nut. In fact, the arrangement disclosed in Figure 1 precludes the necessity of changing the conventional design of the nut or clamping member to accommodate the gripping elements of the washer. By having the openings or pockets in the other modifications opening outwardly and positioned on the outer periphery of the clamping member, the ease with which the assembly may be produced is greatly facilitated. By having the gripping elements so arranged to yieldably and thus frictionally bear against the peripheral surface of the clamping member, a very practical and effective means is provided for impositively, yet adequately, securing the washer and clamping member together as an operable unit. It will be noted that the gripping elements are preferably rounded or chamfered so as to facilitate their application to the clamping member. Likewise, in some instances it is preferable to round or chamfer the circumferential edge of the clamping member which borders the clamping surface thereof. Attention is directed to the fact that the invention is by no means limited to a nut and washer construction, but contemplates various forms of rotary clamping devices in combination with washers.

While I have disclosed specific embodiments of the invention in the drawing, it should be understood that said invention is capable of various modifications and changes without departing from the spirit and scope of the appended claims.

Having thus described my invention, what I claim as new and desire to secure by Letters Patent is:

1. A locking device including a rotary clamping member having a clamping surface and a plurality of side faces, a plurality of circumferentially spaced recesses extending radially outward in said faces, said recesses being deeper at the end removed from the clamping surface to present exposed surfaces inclined with respect to the axis of the clamping member, a lock washer formed of spring stock, said washer including an annular body portion and a plurality of internal marginal resilient prongs warped out of the plane of the body residing adjacent the clamping surface for locking thereto, and means extending out of the plane of the washer body and into said exposed recesses of the clamping member and adapted to bear against the inclined surfaces presented by said recesses for securing the washer and clamping member together as a unit.

2. A locking device including a rotary clamping member having a clamping surface and a plurality of side faces, a plurality of circumferentially spaced recesses extending radially outward in the side faces to present exposed surfaces inclined toward the axis of the clamping member in a direction away from the clamping surface, a lock washer formed of spring stock and residing adjacent the clamping surface, said washer including an annular body portion and a plurality of internal marginal resilient prongs warped out of the plane of the body, and a pair of resilient prong members extending out of the plane of the washer body and adapted to be received by said recesses, said prong members being yieldable toward each other when initially inserted within said recesses and resiliently bearing against said exposed surfaces.

3. A locking device including an annular body of spring stock, a plurality of marginal resilient prongs warped out of the plane thereof, and anchoring means extending out of the plane of the washer body, said anchoring means provided with a locking tooth designed to permit movement of the washer axially in a given direction and to tend to dig into the surface of and lockingly engage a work piece to prevent axial movement of the washer in the opposite direction.

4. A locking device comprising, in combination, a rotary clamping member having a clamping surface and faces parallel with the axis of said member, and a lock washer formed of spring stock, said washer having a flat annular body portion, a plurality of resilient radial prongs about the inner margin of said body providing locking portions extending out of the plane of the washer body for engaging said clamping surface, and a plurality of finers about the outer margin of said body extending upwardly therefrom and inwardly of a perpendicular to the plane of said body, said fingers bearing on the face, and a plurality of fingers about the outer securing said clamping member and washer together as a unit, said prongs, annular body, and fingers being so disposed as to prevent inward movement of the prongs when the washer is clamped against a work piece.

CARL G. OLSON.